May 31, 1955 A. R. PEASE, SR 2,709,317
CHUM HOLDER
Filed May 27, 1954
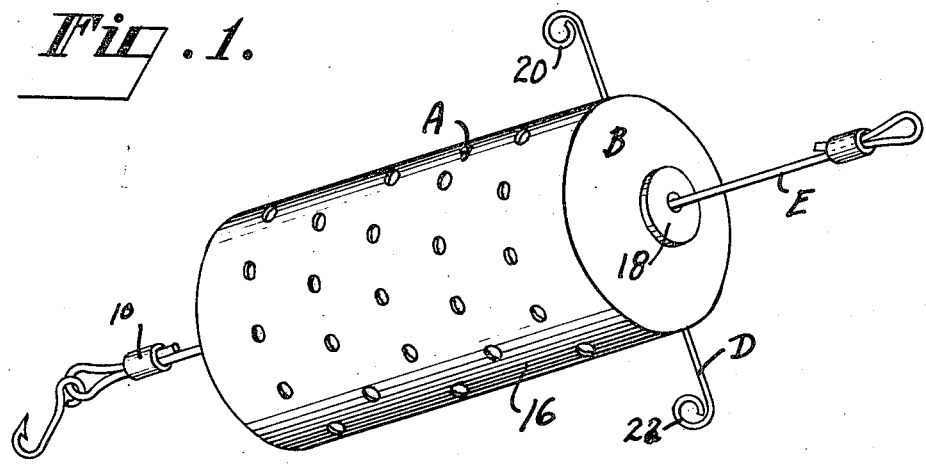
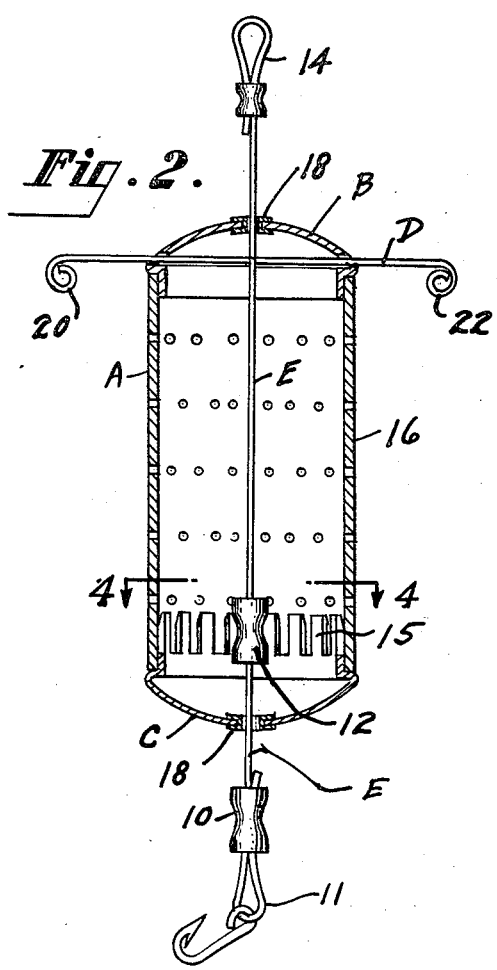
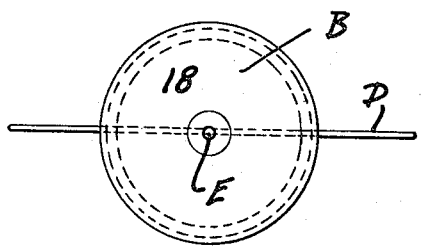
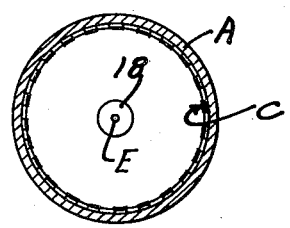
INVENTOR.
ARTHUR R. PEASE, SR.
BY Harry Sangsam
ATTORNEY

# United States Patent Office 2,709,317
Patented May 31, 1955

2,709,317

CHUM HOLDER

Arthur R. Pease, Sr., Philadelphia, Pa.

Application May 27, 1954, Serial No. 432,700

2 Claims. (Cl. 43—44.99)

My invention relates to a device for retaining material which is released when the device and its contents are immersed in water to attract fish while fishing.

The present invention may be used for most types of fishing, such as trolling, surf fishing, pier fishing, deep sea fishing, casting, and bay fishing. In the present invention, water pressure forces the chum out when fishing or trolling. This is achieved by raising the line in the water while fishing so that the chum within the holder is emitted through the openings in the casing, thereby attracting fish. In the present invention, there is no need to use rigs, spreaders, and no swivel is needed. The chum holder of my invention is normally of the weight of the average sinker used for most types of fishing. It is devised so that additional weight can be attached when fishing in stronger currents. The device also is utilized to serve as a spreader to hold a plurality of hooks.

Therefore, it is an object of my invention to provide a holder that will release tiny particles of food and slick to attract fish.

Another object of my invention is to provide a device to hold chum which is used for bottom or deep sea fishing.

Another object of my invention is to provide a chum holder wherein each fisherman may have his own individual chum holder, which may be used for trolling, surf fishing, pier casting, deep sea, or bay fishing.

Another object of my invention is to provide a chum holder wherein the unit may be easily assembled and cleaned, and which will expel its contents during the fishing process.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawings in which:

Fig. 1 is a perspective view of a chum holder embodying my invention.

Fig. 2 is a central longitudinal sectional view of the chum holder embodying my invention.

Fig. 3 is a top plan view of the chum holder embodying my invention.

Fig. 4 is a sectional view taken along the line 4—4 of Fig. 2.

Referring now in greater detail to the drawings, I show a chum holder which is comprised of a perforated cylindrical hollow body, generally designated A, which may be made of plastic or molded material. A fixed cap, generally designated B, closes the top of the body and a removable cap, generally designated C, closes the bottom of the cylinder. Through a central opening in the cap B and the bottom cap C passes a catgut, generally designated E, which has a loop 14 at the top and a lower loop 11 at the bottom for connection either to hooks, to dipsys, or to a line. At the bottom of the catgut, just above the collar 10, is a second collar 12, securely crimped to the line so that the bottom removable cap C is positioned between the two collars 10 and 12. This means that when a person throws the chum overboard from a fishing line, the collar 10 will abut against the outside of the cap C to keep it in place. In order to remove the cap, all the fisherman need do is to pull on the lower loop 11 so that the collar 12 engages the inner surface of the cap C.

Hence, the string E adjacent to the bottom has two collars 10, 12, between which is the central portion of the removable cap C. Hence, the cap C can be held closed by one collar 10 pulling the cap tightly against the body A. The cap C has spring fingers 15 which abut the inside of the perforated body 16. This enables the cap to be easily removed.

The upper cap B has a spreader passing therethrough, to which hooks or other fishing units may be fastened. The wire D serves the unit as the spreader and has loops 20, 22 at its ends.

In the central part of the fixed cap B is an eyelet 18 which is much larger than the diameter of the cord E in order to permit water pressure to expel the chum while trolling.

The perforated body 16 may be made of plastic material or metal. The holes enable the particles of chum to be expelled in order to attract fish. This device also may be used for deep sea fishing.

The catgut E extends through the fixed cap B, the body A, and the removable cap C.

Although my invention has been described in considerable detail, such description is intended as being illustrative rather than limiting, since the invention may be variously embodied, and the scope of the invention is to be determined as claimed.

I claim as my invention:

1. In a chum holder, a perforated cylindrical body, a cap affixed to the upper end of said body and securely fastened thereto, a removable cap having spring fingers adapted to penetrate within the interior of the bottom of said body, a cord extending through the upper cap and lower cap and a collar secured on said cord adapted to hold said removable cap in closed position with the fingers within said body.

2. In a chum holder, a perforated cylindrical body, a cap affixed to the upper end of said body and securely fastened thereto, a removable cap having spring fingers adapted to penetrate within the bottom of said body, a cord extending through the upper and lower cap, a collar secured on said cord adapted to hold said removable cap in closed position with the fingers within said body, and a second collar secured on said cord whereby said removable bottom cap is located between said collars, one of which is adapted to effect removal of said cap by a pulling force on the cord in a direction exteriorly of the removable bottom cap on the opposite side thereof, and the other of which is adapted to close said removable bottom cap by a pulling force in the opposite direction.

References Cited in the file of this patent

UNITED STATES PATENTS

| Number | Name | Date |
|---|---|---|
| 55,008 | Gannet | May 22, 1866 |
| 758,434 | Forster | Apr. 26, 1904 |
| 1,489,156 | Russell | Apr. 1, 1924 |
| 2,081,671 | Lauer | May 25, 1937 |
| 2,532,879 | Baker | Dec. 5, 1950 |
| 2,637,467 | Becker | May 5, 1953 |
| 2,640,292 | Nadolny | June 2, 1953 |